(12) United States Patent
Xiao et al.

(10) Patent No.: US 12,269,176 B2
(45) Date of Patent: Apr. 8, 2025

(54) CARRYING AND DEFLECTION CORRECTION SYSTEM FOR ELASTIC MATERIAL, AND METHOD THEREOF

(71) Applicant: ANJI BATA ROBOT CO., LTD., Huzhou (CN)

(72) Inventors: Zhanchun Xiao, Huzhou (CN); Youlai Zheng, Huzhou (CN); Dongyang Zhang, Huzhou (CN); Yiting Wang, Huzhou (CN)

(73) Assignee: ANJI BATA ROBOT CO., LTD., Huzhou (CN)

( * ) Notice: Subject to any disclaimer, the term of this patent is extended or adjusted under 35 U.S.C. 154(b) by 340 days.

(21) Appl. No.: 17/621,714

(22) PCT Filed: Jun. 24, 2020

(86) PCT No.: PCT/CN2020/097844
§ 371 (c)(1),
(2) Date: Dec. 22, 2021

(87) PCT Pub. No.: WO2020/259521
PCT Pub. Date: Dec. 30, 2020

(65) Prior Publication Data
US 2022/0241979 A1   Aug. 4, 2022

(30) Foreign Application Priority Data
Jun. 25, 2019   (CN) .......................... 201910555750.8

(51) Int. Cl.
*B25J 9/16* (2006.01)
*B25J 11/00* (2006.01)

(52) U.S. Cl.
CPC ........... *B25J 9/1697* (2013.01); *B25J 9/1602* (2013.01); *B25J 11/005* (2013.01)

(58) Field of Classification Search
CPC ...... B25J 9/1697; B25J 9/1602; B25J 11/005; B25J 15/0052; B25J 15/0071;
(Continued)

(56) References Cited

U.S. PATENT DOCUMENTS 5,579,444 A * 11/1996 Dalziel .................. B25J 9/1697
382/153
11,129,318 B1 * 9/2021 Rujanavech ....... H05K 13/0486
(Continued)

FOREIGN PATENT DOCUMENTS

CN      201185778 Y    1/2009
CN      201721916 U    1/2011
(Continued)

OTHER PUBLICATIONS

CN-106346486-B translation (Year: 2018).*
(Continued)

*Primary Examiner* — Kyle T Johnson
(74) *Attorney, Agent, or Firm* — Olive Law Group, PLLC

(57) ABSTRACT

Embodiments provide a system suitable for handling and correcting elastic materials and a method thereof. In the embodiments, a system for handling and correcting elastic materials includes a workbench, and also includes: an image recognition device, a control unit, a motion robot and a correction device.

7 Claims, 9 Drawing Sheets

(58) Field of Classification Search
CPC .... B25J 19/023; B32B 37/00; B65H 23/0204; B65H 23/032; B65H 26/00; B65H 2701/1133; G05B 2219/40607
See application file for complete search history.

(56) References Cited

U.S. PATENT DOCUMENTS

| | | | | |
|---|---|---|---|---|
| 2003/0144765 | A1* | 7/2003 | Habibi | G06T 1/0007 700/259 |
| 2010/0126118 | A1* | 5/2010 | Actis | B65D 33/001 53/64 |
| 2013/0249157 | A1* | 9/2013 | Endo | B25J 9/026 29/559 |
| 2018/0311830 | A1* | 11/2018 | Bertelmann | B65H 3/22 |
| 2019/0047156 | A1* | 2/2019 | Curhan | B25J 15/12 |
| 2019/0176348 | A1* | 6/2019 | Bingham | B25J 9/1697 |
| 2019/0201136 | A1* | 7/2019 | Shelton, IV | A61B 1/051 |
| 2022/0241979 | A1* | 8/2022 | Xiao | B25J 11/005 |

FOREIGN PATENT DOCUMENTS

| | | | | |
|---|---|---|---|---|
| CN | 105269329 | A * | 1/2016 | B23P 23/06 |
| CN | 106695784 | A * | 5/2017 | |
| CN | 106346486 | B * | 7/2018 | B25J 9/161 |
| CN | 110065824 | A | 7/2019 | |
| CN | 110143444 | A | 8/2019 | |
| CN | 111285011 | B | 12/2020 | |
| WO | WO-2009080233 | A1 * | 7/2009 | B23K 26/042 |
| WO | WO-2016067062 | A2 * | 5/2016 | B29C 66/727 |

OTHER PUBLICATIONS

WO-2009080233-A1 translation (Year: 2009).*
CN-106695784-A translation (Year: 2017).*
CN-105269329-A translation (Year: 2016).*
Visual_grasp_point_localization_classification_and_state_recognition_in_robotic_manipulation_of_cloth (Year: 2017).*

* cited by examiner

CARRYING AND DEFLECTION CORRECTION SYSTEM FOR ELASTIC MATERIAL, AND METHOD THEREOF

CROSS REFERENCE TO RELATED APPLICATIONS

This application is a national stage application of PCT International Patent Application No. PCT/CN2020/097844, filed Jun. 24, 2020, which claims priority to Chinese Patent Application No. 201910555750.8, filed Jun. 25, 2019; the contents of which are incorporated herein by reference in their entireties.

TECHNICAL FIELD

The present disclosure relates to the field of elastic material manufacturing and processing, and in particular to a system and method suitable for handling and correcting elastic materials.

BACKGROUND

Elastic materials such as sponges are common materials and are often processed into different products. For example, a multifunctional laminated pad disclosed in the Chinese patent with the Publication No.: CN201185778Y includes a base, a sponge layer and a number of pads with different functions. In the production process of these laminated mats, the layers are stacked layer by layer, and the position and angle of the layer must be correct during the stacking process.

However, in this production process, elastic materials such as sponge, according to its manufacturing process and the physical and chemical properties of its own elastic body, are affected by the environmental temperature and humidity, the duration of the foaming internal stress release, and external forces. On the size scale of the common mattress, its outline size has random deformations ranging from several millimeters to tens of millimeters. At present, the sponge lamination process of mattress production at home and abroad often still relies on manual operations. Specifically, using 4 workers, manual laminating method, the naked eye can observe the deformation of the sponge. The human hand pulls or compresses the sponge to deform, so that the outer contours of the upper and lower layers of the sponge overlap.

However, such an operation method has certain defects. Because the products corresponding to elastic materials, such as sponge mattresses, are large in size and soft, they are very difficult to handle. Some high-density products can weigh 50 kg. It requires workers to perform the operation, and the manual labor intensity is high. In addition, because workers observe the deformation with naked eyes and perform manual pulling, the production efficiency is low, and the accuracy and quality stability of the lamination are poor.

SUMMARY

The present disclosure is intended to provide a system and method suitable for handling and correcting elastic materials, such that correction operations with a high degree of automation and precise control can be performed relying on automated equipment.

The solution of the present disclosure is achieved by:

an image recognition device configured for photographing images of a base and an upper piece;

a control unit in communication connection with the image recognition device, and configured for receiving image information collected by the image recognition device and generating control instructions based on the image information;

a motion robot in communication connection with the control unit, and configured for receiving the control instructions sent by the control unit;

a correction device connected to the motion robot and in communication connection with the control unit, and configured for receiving the control instructions sent by the control unit, and grabbing the upper piece.

In one embodiment, the image recognition device includes a camera and a flash.

In one embodiment, the control unit is configured for calculating center position data, deflection angle data and contour data of the base and the upper piece according to the image information.

In one embodiment, the center position data comprises center point coordinate data, and the deflection angle data comprises rotation angle data relative to the image recognition device; the upper piece and the base comprise a plurality of feature points on contour lines, and the contour data comprises a plurality of feature point coordinate data.

In one embodiment, the correction device comprises a main frame, and the main frame is connected with correctors; the correctors comprises two-way correctors that can move back and forth in a horizontal direction or can move left and right in the horizontal direction relative to the main frame, and four-way correctors that can move back and forth in a horizontal direction or can move left and right in the horizontal direction relative to the main frame; the four-way correctors are distributed on corners of the main frame.

In one embodiment, eight four-way correctors are provided on four corners of the main frame.

In one embodiment, the main frame includes an outer frame and an inner frame located in the outer frame, and diagonal reinforcement posts are connected to the diagonal positions of the outer frame and the inner frame.

In one embodiment, two diagonal reinforcement posts are provided, and a middle connecting block is provided at the intersection position thereof; the middle connecting block is connected with a lifting arm connection port for connecting a lifting arm.

In one embodiment, each of the two-way correctors is movably connected with the outer frame, and each of the four-way corrector is movably connected with the outer frame and the diagonal reinforcement post.

In one embodiment, the each of the two-way corrector includes a third motor fixedly connected to the outer frame and a bending slide piece threadedly connected to the motor shaft of the third motor; the bending slide piece includes low parts on both sides and a high part in the middle, the low part is connected with the horizontal connecting piece, the high part is slidably connected to the vertical connecting post, the vertical connecting post is connected to the outer frame, and the horizontal connecting piece is connected with a co-linking plate, and the co-linking plate is installed with a piercing unit.

In one embodiment, the piercing unit includes a drive rod and a needle connected to the end of the drive rod, the needle is arranged obliquely, and the extension direction of the needle is consistent with the extension direction of the drive rod.

In one embodiment, each drive rod is provided with a correction plate at the end, a plurality of the needles parallel to each other are installed on the correction plate, and the correction plate is located above the co-linking plate in the height direction, the co-linking plate is provided with a guide hole for the needle to pass through.

In one embodiment, the each of the two-way corrector includes two sets of the piercing units that are symmetrically arranged, the extension direction of the needle and the extension direction of the drive rod are both obliquely arranged, the inclination direction of the needle is a horizontal downward direction gradually away from the needle of another set of the piercing unit in the horizontal direction.

In one embodiment, the four-direction corrector includes a first sliding device slidably connected to the main frame, the first sliding device is slidably connected to a second sliding device, and the second sliding device is provided with a pad remover for clamping and holding a mat.

In one embodiment, the sliding directions of the first sliding device and the second sliding device are both horizontal, and the two sliding directions are perpendicular to each other.

In one embodiment, the sliding device includes a motor connected to the main frame, a rotating shaft driven by the motor, a connecting piece connected to the rotating shaft, and a sliding frame connected to the connecting piece and slidably connected with the main frame; the connecting piece includes a nut connecting piece threadedly connected with the rotating shaft.

In one embodiment, the second sliding device includes a second motor, a second rotating shaft, and a second connecting piece. The second connecting piece is connected to the second rotating shaft, and the second connecting piece is slidably connected with the connecting piece, the second motor is fixedly connected to the connecting piece.

In one embodiment, the second connecting piece is connected to the pad remover.

In one embodiment, the pad remover includes a fixed plate connected to the second connecting piece and a pad picker connected with the fixed plate, and the pad picker includes a pricker.

In one embodiment, the pricker is arranged obliquely, and the oblique direction is in a vertical downward direction gradually away from the central axis of the fixed plate in the horizontal direction.

In one embodiment, the pad remover includes a pad picker connected to the fixed plate, the pad picker includes a driver and a needle connecting plate connected to the end of the driver, and the pricker is connected to the needle connecting plate.

In one embodiment, the extension direction of the pricker is parallel to the expansion and contraction direction of the driver.

In one embodiment, the pad picker includes a forward pad picker and a reverse pad picker, and the forward pad picker and the reverse pad picker are arranged opposite to each other.

A method for using the system for handling and correcting elastic materials comprising the steps of:

S01, taking, by an image recognition device, images of a base and a upper piece, and sending to a control unit;

S02, calculating, by the control unit, adjustment data of the upper piece and the base based on the taken image, and generating motion control data based on the adjustment data;

S03, controlling, by the control unit, the motion robot for a handle and move, and then adjusting the upper piece.

In one embodiment, the step of adjusting the upper piece comprises steps of positioning, laminating and correcting the outer contour of the upper piece (83); center point coordinates, deflection angles and contour coordinate differences of the base and the upper piece are calculated by the control unit based on the taken image;

in step S03, the motion robot moves and rotates the upper piece, making the center points of the upper piece and the base coincide with the deflection angles;

in step S04, the correction device corrects the upper piece to be stabbed based on the contour coordinate differences, making the outer contour of the upper piece is consistent with an outer contour of the base.

In summary, the present disclosure has the following beneficial effects:

1. Through visual recognition and software calculations throughout the entire process, the mats are moved, turned, aligned, and corrected with high efficiency that is equivalent to the efficiency of 8 workers.

2. Automated mechanical equipment is adopted to operate, and the entire process is unmanned.

3. The main frame is moved in all directions by the robotic arm to move the mat.

4. The corrector includes two-way correctors and four-way correctors, which are suitable for different sizes and different types of laminated pad products.

5. The function of correcting deviation is completed at the same time as the upper workpiece is moved by the robotic arm, such that time can be save with high efficiency.

6. The piercing unit adopts a two-way external puncture design, the puncturing effect is stable, and the pad is not easy to slip off.

1, main frame; 11, outer frame; 12, inner frame; 13, diagonal reinforcement post; 14, middle connecting block; 15, lifting arm connection port; 16, main beam; 17, rail beam;

2, first sliding device; 21, motor; 22, rotating shaft; 23, connecting piece; 231, nut connecting piece; 24, sliding frame;

3, second sliding device; 31, second motor; 32, second rotating shaft; 33, second connecting piece;

4, pad remover; 41, fixed plate; 42, pad picker; 421, driver; 422, connecting needle plate; 423, pricker;

5, corrector; 51, two-way corrector; 511, vertical connecting post; 512, bending slide piece; 513, third motor; 514, transverse connecting piece; 52, four-way corrector;

6, co-linking plate; 61, guide hole;

7, piercing unit; 71, drive rod; 72, correction plate; 73, needle;

81, workbench; 82, base; 83, upper piece; 84, image recognition device; 85, control unit; 86, motion robot; 87, correction device.

DESCRIPTION OF EMBODIMENTS

The present disclosure will be described in further detail below with reference to the accompanying drawings.

The specific embodiment is only an explanation of the present disclosure, and it is not a limitation of the present disclosure. After reading this specification, those skilled in the art can make modifications to the embodiments without inventive work as needed, but as long as they fall within the scope of the appended claims of the present disclosure, they are protected by the patent law.

Example 1

Figure 1:
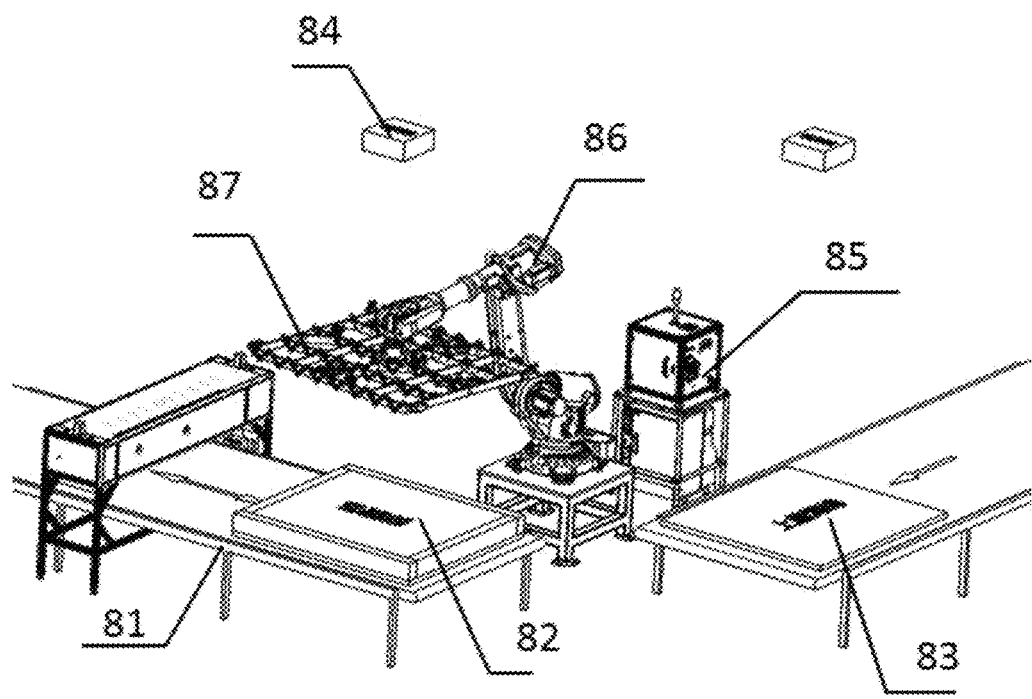
FIG. 1 is a schematic diagram of the first embodiment.
Figure 2:
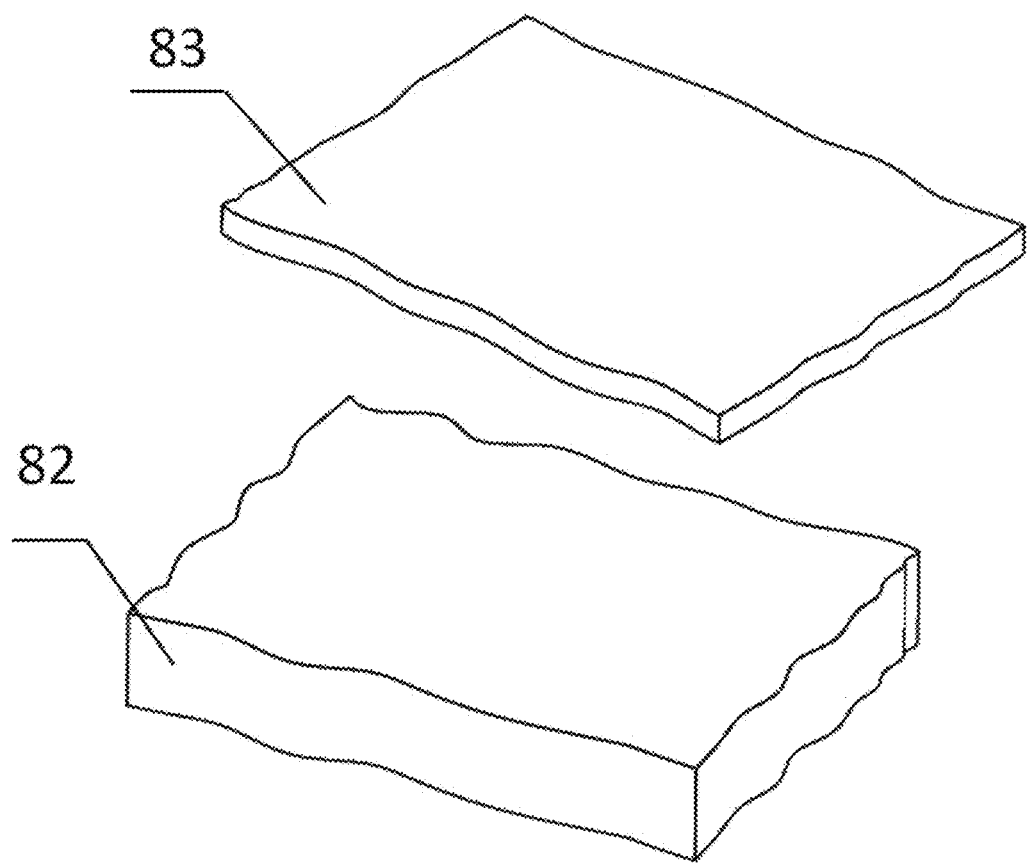
FIG. 2 is a schematic diagram of a base and an upper piece.

As shown in FIGS. 1 and 2, a base 82 and an upper piece 83 are placed on different workbenches 81. The upper piece 83 needs to be stacked on the base 82, and the upper piece 83 is correctly positioned, angled and contour coincident. The base 82 can be a sponge or a template, etc., and the outlines of both tend to have a certain irregular deformation deviation as shown in FIG. 2.

The upper piece 83 is often large in size and heavy in weight, and the labor intensity is too great if it is manually operated by a worker. And because the upper piece 83 is often made of sponge, rubber or other elastic materials, or even cloth, the contour is irregularly deformed. Therefore, manual operations are often inaccurate. This technical solution uses an automated technical solution.

As shown in FIG. 1, the motion robot 86 may be a multi joint robot, and its multi-segment robot arm can complete actions such as rotation, twisting, and translation. The multi joint robot is mature in the prior art, and its specific structure will not be repeated here, and ABB-IRB6700-245 robot in the prior art can be used. A correction device 87 is connected to the end of the motion robot 86. The correction device 87 can use a needle-punching technical solution to pierce/grab the upper piece 83, or a sucker technical solution to suck the upper piece 83. The technical solution of piecing will be used as an example below.

The image recognition device 84 is used to take pictures, and can be a video camera or a camera, and is often equipped with a flash to ensure the brightness of the picture and suppress ambient light interference. There may be two image recognition devices 84, which respectively take images of the upper piece 83 and the base 82, and send the images to the control unit 85 through wired transmission or wireless transmission. The control unit 85 can be a control cabinet, and the control cabinet may be an industrial control computer or other electronic circuit board capable of running software. Corresponding computing software is preset in the computer, and the programming language of the software is not limited, and it can be programmed by those skilled in the art according to the function. The industrial control computer calculates at least three data from the image just captured, which are the center point coordinates, deflection angles, and contour coordinate differences of the base 82 and the upper piece 83, respectively.

In positioning and laminating steps, based on the center point coordinates and the deflection angle data, the control unit 85 controls the movement and rotation of the robot arm of the motion robot 86. This process ensures that the center points of the two workpieces are aligned and coincide with the deflection angles. In the correction step, on the upper piece 83 and the base 82, the system divides the contour lines of these two parts into several feature points, and records the coordinate data corresponding to each feature point. According to the contour coordinate difference, the correction device 87 is used to correct the deviation, so that the outer contour of the upper piece 83 is completely consistent with the outer contour of the base 82. It should be noted that in the present technical solution, it is not that the motion robot 86 locates and laminates the upper piece 83, and places the upper piece 83 on the base 82 and then performs targeted corrections, but is that in the process that the upper piece 83 moved by the motion robot 86 has already been performed and the correction has been completed. This design has greatly improved the efficiency of the process and greatly shortened the process time.

The specific structure and steps for correcting are described below.

Figure 3:
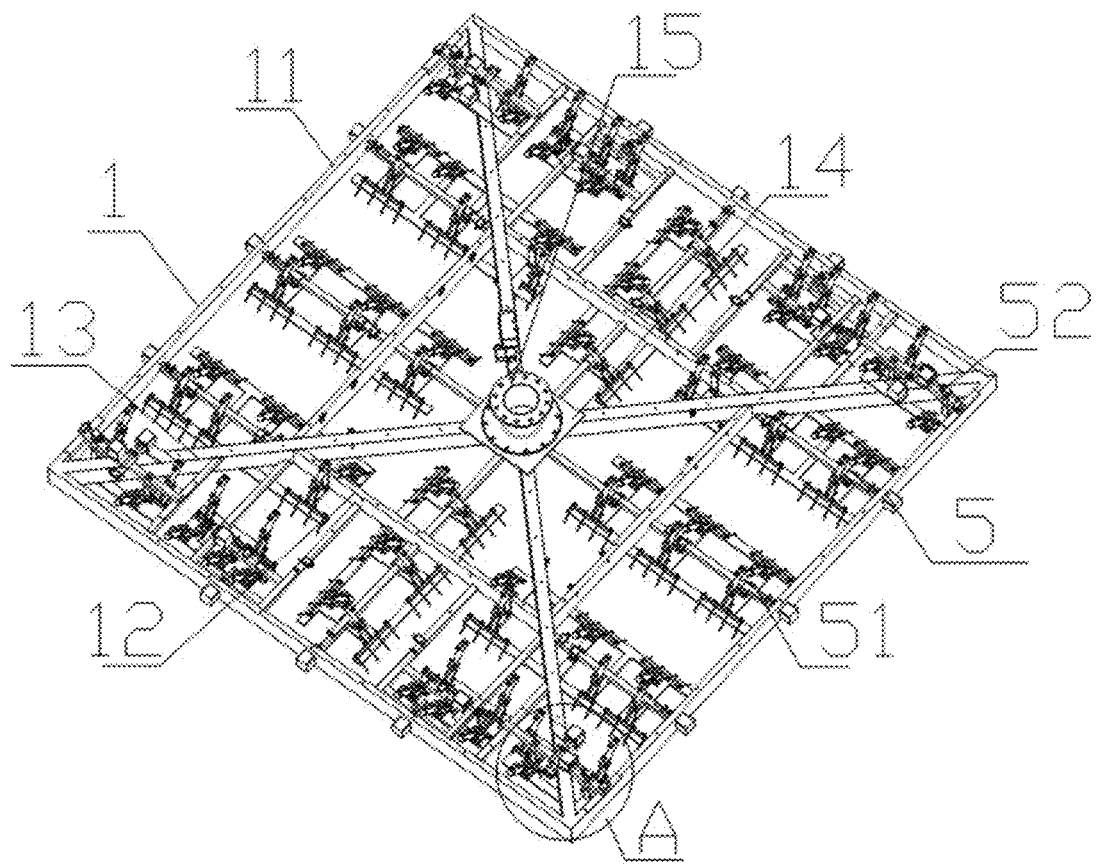
FIG. 3 is a schematic diagram of a correction device.

The specific structure of the correction device 87 shown in FIG. 3 includes a main frame 1. As a load-bearing frame, the main frame 1 is also the main support of this technical solution, the material is not limited. The main frame 1 includes two lip-shaped outer frames 11 and an inner frame 12 inside, and two diagonal reinforcement posts 13 are provided on the diagonal of the outer frame 11. The diagonal reinforcement post 13 is also connected to the diagonal of the inner frame 12 at the same time. The diagonal reinforcement post 13 not only strengthens the structural strength of the inner frame 12 and the outer frame 11, but also facilitates the installation and guidance of other parts.

A rectangular middle connecting block 14 is provided at the central staggered connection of the two diagonal reinforcement posts 13, to further increase the force structure of the central area. The middle connecting block 14 is provided with a lifting arm connection port 15 configured to connect the robot arm of the motion robot 86. Under the traction of the mechanical arm, the entire main frame 1 moves in the vertical and horizontal directions.

The main frame 1 is connected with at least one corrector 5, and a plurality of correctors 5 are provided in one embodiment, which are used to fork the bottom pad, that is, the upper piece 83. Different correctors 5 are installed at different positions on the main frame 1. During the operation process, the upper piece 83 needs to be placed on the base 82.

Since the main frame 1 is provided with a plurality of correctors 5, different sizes of pads can use different numbers of correctors 5.

In one embodiment, the correctors 5 are divided into two types according to their structures and functions, namely two-way correctors 51 and four-way correctors 52. The former is horizontal sliding on the left and right sides, or sliding on the front and back sides.

The latter is able to slide on the left and right sides as well as the front and back sides. Among them, the four-way correctors 52 are distributed at the corners of the outer frame 11. In one embodiment, four four-way correctors 52 are provided, which are respectively located at the four corners of the outer frame 11.

Figure 4:
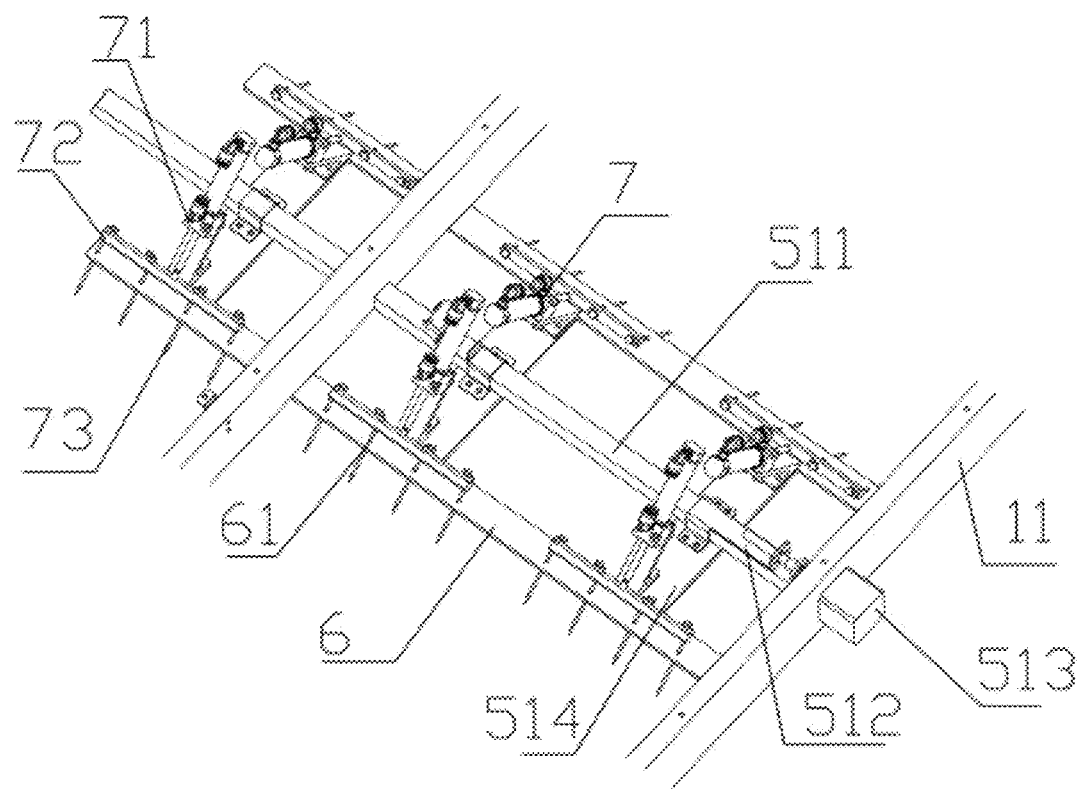
FIG. 4 is a schematic diagram of a two-way corrector.

The working principle of the two-way corrector 51 is first introduced below. As shown in FIG. 3 and FIG. 4, a plurality of two-way correctors 51 are provided and respectively installed on different sides of the outer frame 11. The direction of each of their motions is often perpendicular to the side to which it is connected. As shown in FIG. 2, the outer frame 11 is installed with a third motor 513. When the third motor 513 rotates, the motor connecting shaft starts to rotate, and the connecting shaft is provided with threads. The bending slide piece 512 is provided with a connecting component, such as a nut, and is screwed to the motor connecting shaft. When the motor connecting shaft rotates, the distance between the bending slide piece 512 and the motor 513 is also locked or extended. The outer frame 11 is vertically provided with vertical connecting posts 511, the left and right sides of which not only strengthen the structural bearing capacity, but also serve as a guide for the movement path. The bending slide piece 512 is in the shape of a zigzag, and includes a high part in the middle and low parts on both sides. The high part slides on the vertical connecting post 511, and the two low parts are used to connect the transverse connecting piece 514 on both sides.

As shown in FIG. 4, a plurality of transverse connecting pieces 514 are provided. The two sides of the plurality of transverse connecting pieces 514 are connected to two co-linking plates 6. Each co-linking plate 6 has a set of piercing units 7. The two sets of piercing units 7 are arranged opposite to each other, and the needle ejection directions are opposite.

Specifically, the piercing unit 7 includes a drive rod 71, which can be a pneumatic rod or other similar drive structure. A correction plate 72 is connected to the end of the pneumatic rod, and the correction plates 72 are installed with a plurality of needle 73. When the pad needs to be pierced, the air rod operates and stretches, the correction plate 72 is driven to move downward, and the needle 73 passes through the guide hole 61 on the co-linking plate 6 and penetrates the pad. The lower surface of the correction plate 72 conflicts with the upper surface of the co-linking plate 6 and interferes, so that the needle 73 will not move down, so as to control the penetration length of the needle 73 and avoid excessive penetration of the pad.

In one embodiment, the expansion and contraction direction of the drive rod 71 is parallel to the extension direction of the needle 73, and is at a certain angle with the horizontal plane, for example, between 40° and 60°. The tilt direction is outward tilt. Specifically, as shown in FIG. 2, the two sets of piercing units 7 are arranged opposite to each other, and the needle ejection direction is opposite. Each needle 73, in a vertical downward direction, gradually moves away from the corresponding needle 73 on the other group of corresponding piercing units 7 in the horizontal direction. This design can not only ensure that the pad is not penetrated too deeply; secondly, the horizontal penetration can be expanded, the pad is not easy to slip off; and thirdly, the double-set spreading of needle is conducive to the flatness and spread of the pad.

Figure 5:
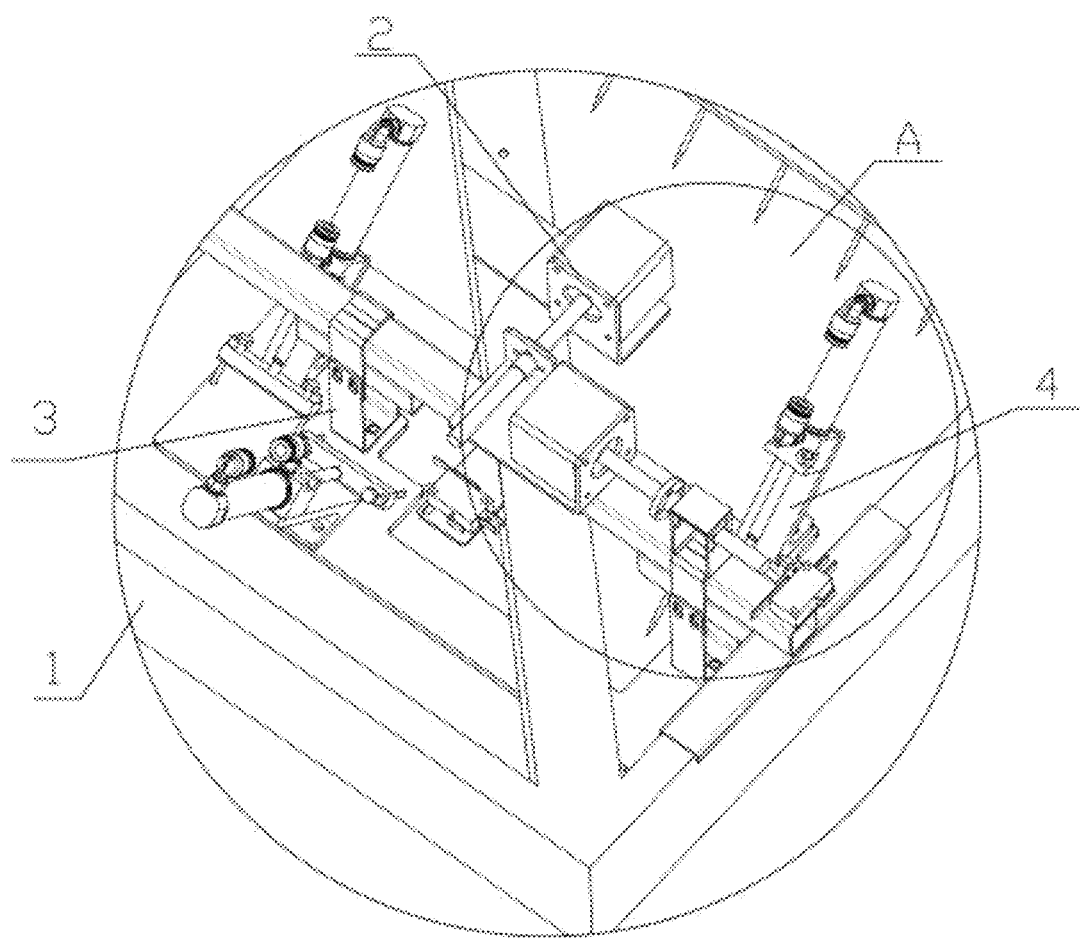
FIG. 5 is a detailed enlarged view of A in FIG. 3.
Figure 6:
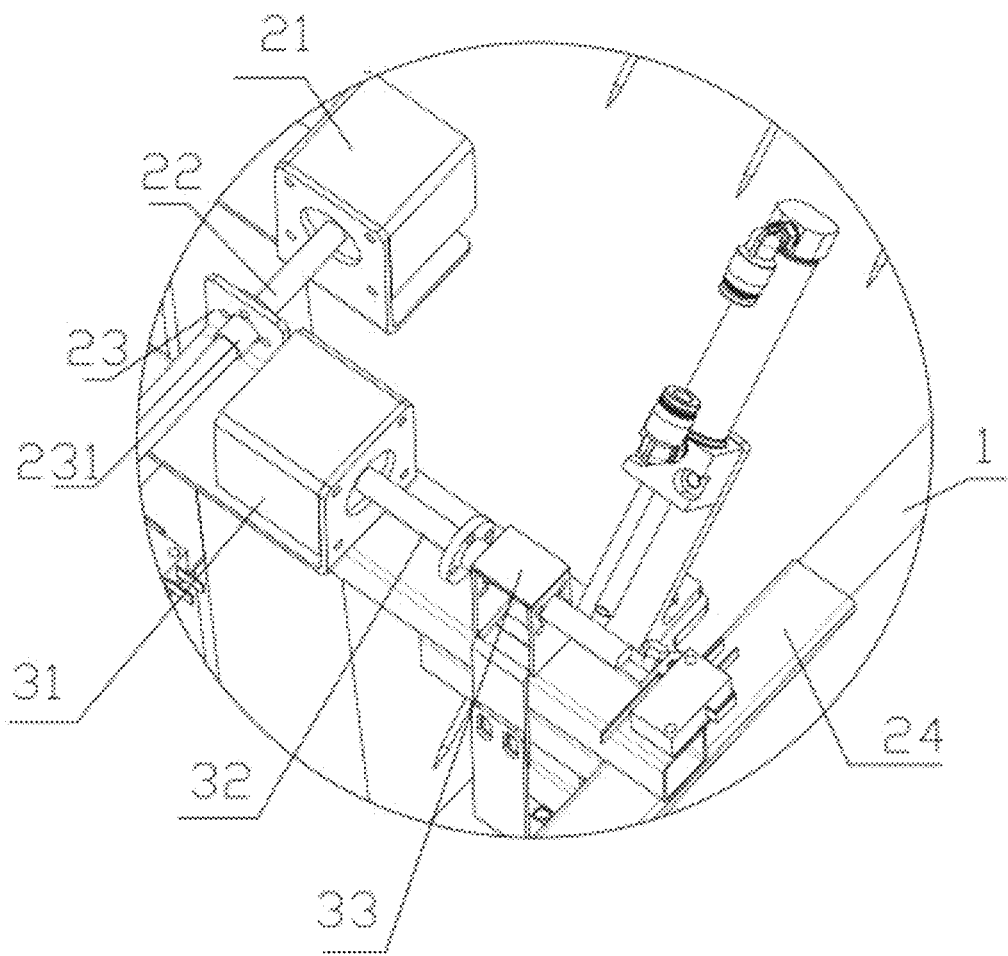
FIG. 6 is a detailed enlarged view of A in FIG. 5.
Figure 7:
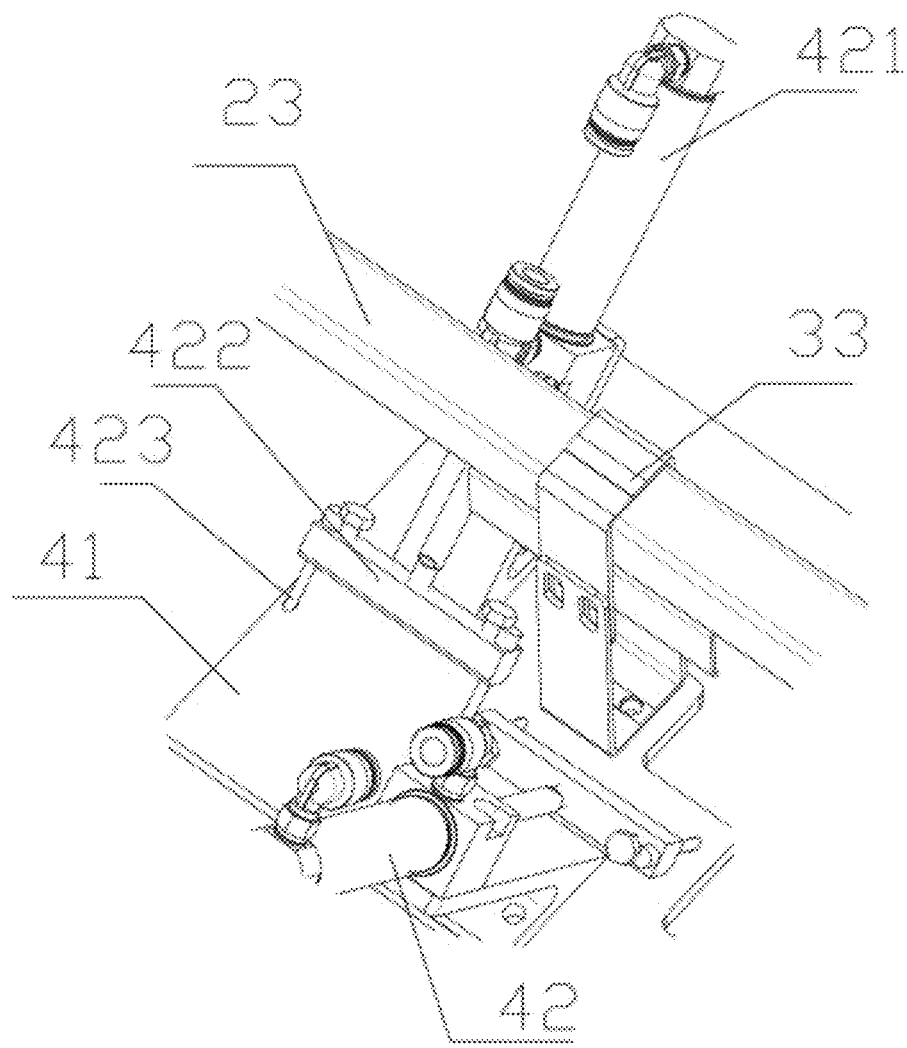
FIG. 7 is a schematic diagram of a pad picker in a four-way corrector.

As shown in FIGS. 3 and 5, a four-way corrector 52 is provided at each corner of the main frame 1. The four-way corrector 52 means that it can move in the horizontal direction, front, back, left, and right, so as to adjust the location of the pad, the specific structure is shown in FIG. 6 and FIG. 7. There are first sliding device 2 and second sliding device 3. The first sliding device 2 includes a motor 21 to drive the rotating shaft 22 to rotate. The motor 21 can be fixedly connected to the diagonal reinforcement post 13. The connecting piece 23 is provided with a nut connecting piece 231, and the nut connecting piece 231 is screwed to the rotating shaft 22. When the rotating shaft 22 rotates, the nut connecting piece 231 will move relative thereto.

The connecting piece 23 is L-shaped, and the connecting piece 23 is connected with a third sliding device 3. Among them, the second motor 31 is fixedly connected to the connecting piece 23. In a same distance, the second rotating shaft 32 rotates, the second connecting piece 33 is also screwed to it, and moves relative to its axial direction. The axial directions of the second rotating shaft 32 and the rotating shaft 22 are perpendicular, so that the second connecting piece 33 can move horizontally in four directions: front, back, left, and right.

As shown in FIG. 7, the upper end of the second connecting piece 33 is connected to the second rotating shaft 32, and the lower end can be fixedly connected to the fixed plate 41. The fixed plate 41 is also connected with a retractable driver 421, such as an air rod. The air rod is connected with a needle connecting plate 422 at the end, and the needle connecting plate 422 is provided with a pricker 423. Each fixed plate 41 may be provided with two-direction pad picker 42. The working principle, the tilt direction and the needle-out direction are the same as the principle of the two-way corrector 51 mentioned above.

In summary, components such as the robot arm of the motion robot 86 drive the entire main frame 1 to move in the horizontal and vertical directions through the lifting arm connection port 15. The pad can be picked through the needle on the corrector 5. Then in the process of placing the layer of pad on top of the lower layer of pad, the air rod is controlled by the control system to control the correctors in different positions to slide in the specified direction. The two-way corrector 51 slides in two directions, and the four-way corrector 52 slides in four directions. The position, angle and flatness of the pad can be adjusted by sliding the correctors in different positions. The whole process is controlled by the numerical control system, the stroke is accurate, the response is fast, and the work is completely unmanned.

It should be noted that, in one embodiment, the step of correcting does not start after the motion robot 86 moves the upper piece 83 into position, but starts when the motion robot 86 moves and rotates the upper piece 83, that is, in the positioning and laminating process, the radial deviation correction operation is synchronized.

Figure 8:
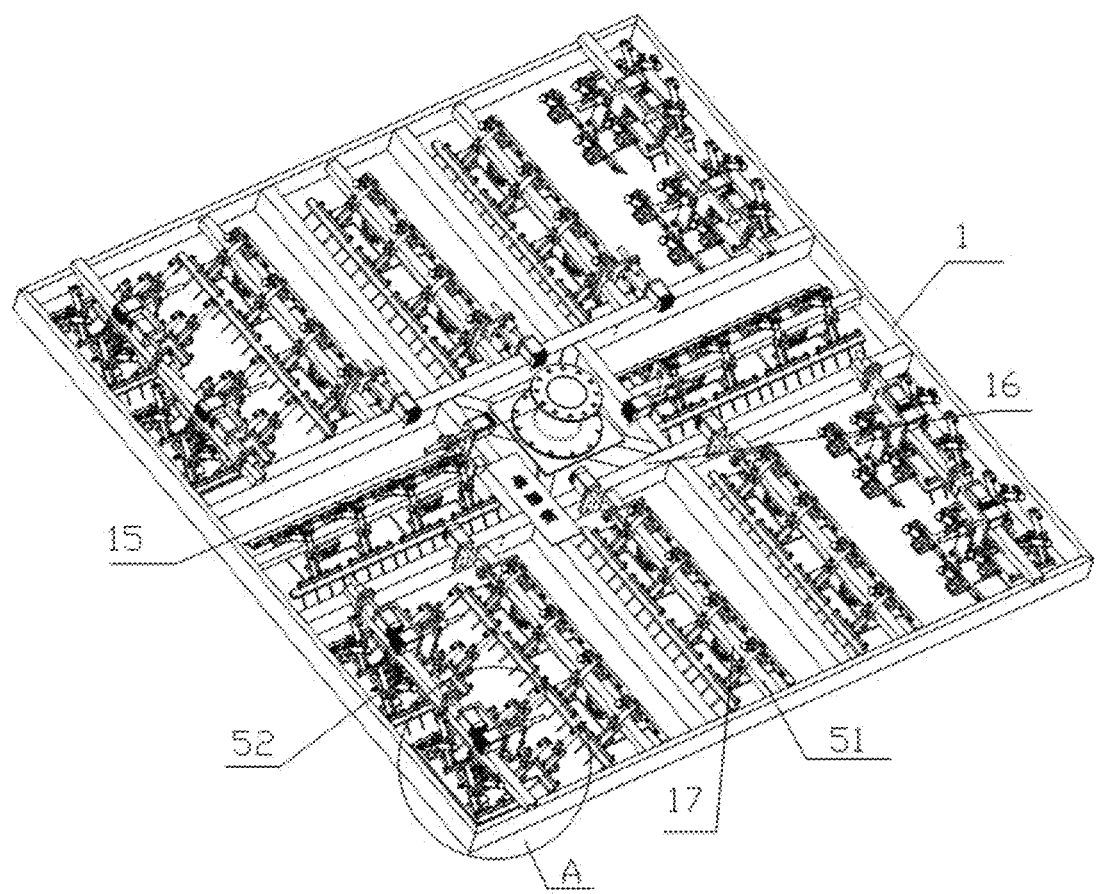
FIG. 8 is a schematic diagram of a correction device in the second embodiment.
Figure 9:
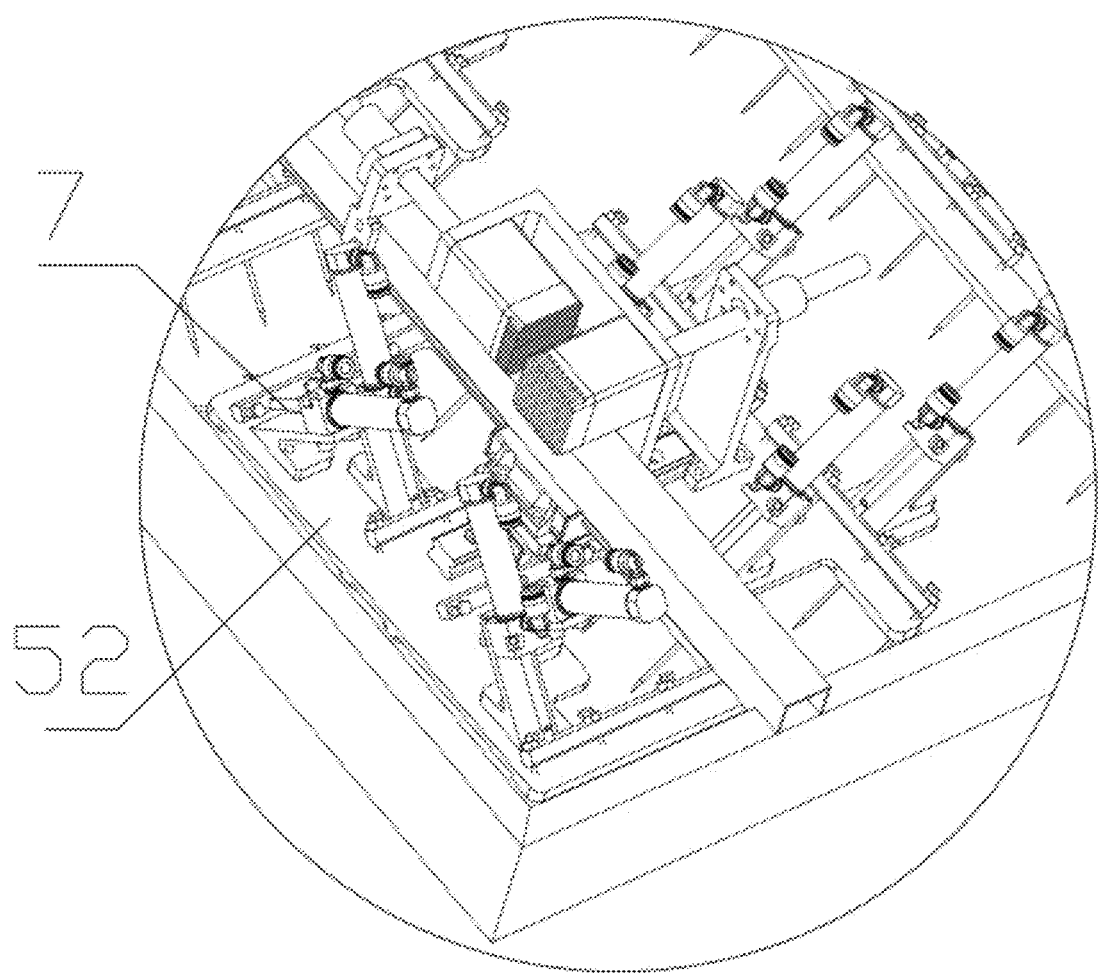
FIG. 9 is a detailed enlarged view of A in FIG. 8.

As shown in FIG. 8 and FIG. 9, this is another example of the technical solution. The working principle of the present example is the same as that of Example 1, but the difference is that the mechanical design and structure of the correction device 87 connected to the motion robot for grabbing the upper piece is different.

In the present example, the structure of the correction device 87 is changed. On the one hand, the frame design has changed from the X-shaped frame in Example 1 to a #-shaped frame in FIG. 8. The staggered diagonal reinforcement posts 13 in the original Example 1 are eliminated. On the other hand, the specific numbers of the two-way corrector 51 and the four-way corrector 52 are changed. As mentioned above, the two-way corrector 51 slides on the left and right sides in the horizontal direction, or slides on the front and back sides in the horizontal direction. The four-way corrector 52 can slide on the left and right sides as well as on the front and back sides. In terms of location distribution, the four-way correctors 52 are still provided at the four corners of the main frame 1. The specific number of the two-way film corrector 51 and the four-way corrector 52 may not be limited, and specific settings and adjustments can be made according to the size and shape of the upper piece 83 actually operated.

Different from Example 1, the present example also modifies the sliding manner of the two-way corrector 51 and the four-way corrector 52. In the present example, a linear guide rail is added. Specifically, as shown in FIG. 8, the main frame 1 includes a main beam 16 connected with a rail beam 17, and the rail beam 17 can be installed with a linear guide rail. Driven by the motor, the piercing unit 7 can slide stably on the rail beam 17.

As shown in FIG. 9, FIG. 9 is a detailed enlarged view of A in FIG. 8, and FIG. 9 is the specific structure of the four-way corrector 52 at the four corners of the main frame 1. As the same as Example 1, two independent motors are also adopted to enable each piercing unit 7 to slide in the horizontal direction, front, back, left, and right. However, in this implementation, on the one hand, the number of the four-way corrector 52 and the number of the piercing units 7 thereon are increased, thereby increasing the stability of the device for fixing the edges and corners of the material, so that the material is not easy to slip off.

In the spatial arrangement of the piercing units 7, they are divided into two parts, which are the ordinary piercing units and the avoidance piercing units. The common piercing units are shown in the lower left corner of FIG. 9, and the arrangement is still oblique and staggered, which is the same as Example 1. However, in the avoidance piercing units, that is, the two sets of piercing units 7 in the upper right corner in FIG. 9, they are parallel to each other, and also slanted outward, but provide space for the installation of the motor and avoid spatial interference.

What is claimed is:

1. A system suitable for handling and correcting elastic materials, comprising a workbench, wherein the system further comprises:
   an image recognition device, configured for photographing images of a base and an upper piece, such that a taken image is obtained;
   a control unit in communication connection with the image recognition device, and configured for receiving image information collected by the image recognition device and generating control instructions based on the image information;
   a motion robot in communication connection with the control unit, and configured for receiving the control instructions sent by the control unit;
   a correction device connected to the motion robot and in communication connection with the control unit, and configured for receiving the control instructions sent by the control unit, and grabbing the upper piece;
   the image recognition device comprises a camera equipped with a flash;
   the control unit is a control cabinet;
   the correction device comprises a main frame, and the main frame is connected with correctors; the correctors comprises two-way correctors that can move back and forth in a horizontal direction or can move left and right in the horizontal direction relative to the main frame, and four-way correctors that can move back and forth in a horizontal direction or can move left and right in the horizontal direction relative to the main frame; the four-way correctors are distributed on four corners of the main frame;
   wherein center point coordinates, deflection angles and contour coordinate differences of the base and the upper piece are calculated by the control unit based on the taken image;
   the motion robot moves and rotates the upper piece, making the center points of the upper piece and the base coincide with the deflection angles;
   the correction device corrects the upper piece to be stabbed based on the contour coordinate differences, making the outer contour of the upper piece consistent with an outer contour of the base.

2. The system suitable for handling and correcting elastic materials according to claim 1, wherein: the control unit is configured for calculating center position data, deflection angle data and contour data of the base and the upper piece according to the image information; the center position data comprises center point coordinate data, and the deflection angle data comprises rotation angle data relative to the image recognition device; the upper piece and the base comprise a plurality of feature points on contour lines, and the contour data comprises a plurality of feature point coordinate data.

3. The system suitable for handling and correcting elastic materials according to claim 1, wherein: the image recognition device comprises a first image recognition device for photographing the base, and a second image recognition device for photographing the upper piece; each of the first image recognition device and the second image recognition device comprises the camera equipped with the flash.

4. The system suitable for handling and correcting elastic materials according to claim 1, wherein: each of the correctors comprises a plurality of piercing units, and each of the plurality of piercing units comprises a needle and a drive rod that drives the needle to extend, the needle has an extension direction consistent with an extension direction of the drive rod.

5. The system suitable for handling and correcting elastic materials according to claim 4, wherein: the plurality of piercing units is arranged alternately and symmetrically in pairs, and the needle is tilted in a horizontal downward direction gradually moving away from the needle of another set of the piercing unit in the horizontal direction.

6. The system suitable for handling and correcting elastic materials according to claim 1, wherein: when the motion robot moves and rotates the upper piece, the correction device performs correction operations on the upper piece at a same time.

7. A method for using the system suitable for handling and correcting elastic materials according to claim 1, comprising the steps of:
   (S01), taking, by the image recognition device, images of the base and the upper piece, and sending to the control unit;
   (S02), calculating, by the control unit, adjustment data of the upper piece and the base based on the taken image, and generating motion control data based on the adjustment data;
   (S03), controlling, by the control unit, the motion robot for a handle and move after stabbing the upper piece, covering the upper piece on the base for laminating,
   (S04), controlling, by the control unit, an operation of an internal motor of the correction device, driving the movement of a needle of the correction device, and adjusting an outer contour of the upper piece;
   wherein adjusting the outer contour of the upper piece comprises steps of positioning, laminating and correcting the outer contour of the upper piece;
   center point coordinates, deflection angles and contour coordinate differences of the base and the upper piece are calculated by the control unit based on the taken image;
   the motion robot moves and rotates the upper piece, making the center points of the upper piece and the base coincide with the deflection angles;
   the correction device corrects the upper piece to be stabbed based on the contour coordinate differences, making the outer contour of the upper piece consistent with an outer contour of the base.

\* \* \* \* \*